H. WULFF.
MACHINE AND METHOD FOR MAKING FIBER SHINGLES.
APPLICATION FILED JAN. 11, 1917.

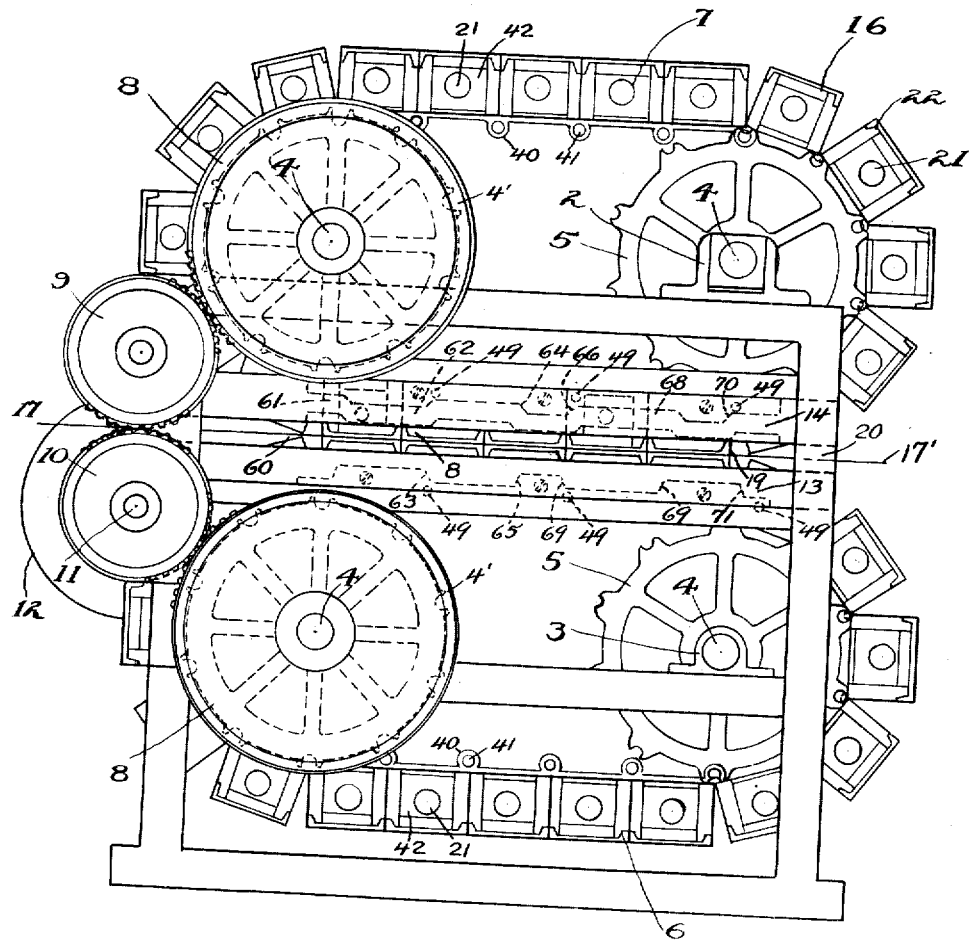

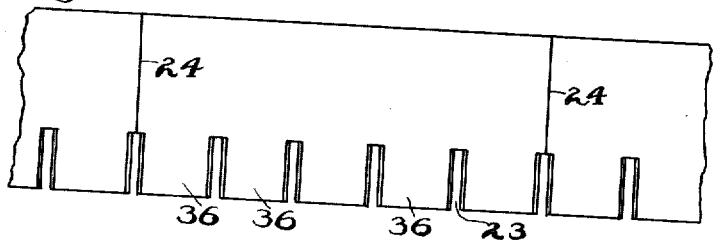
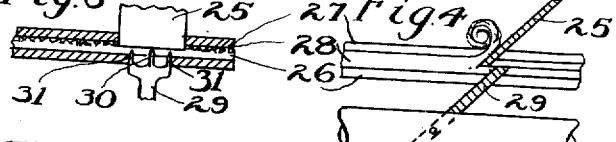
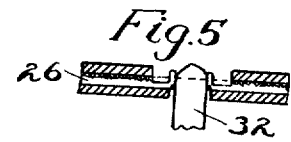
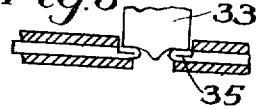
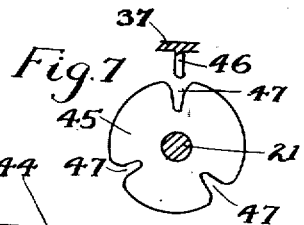
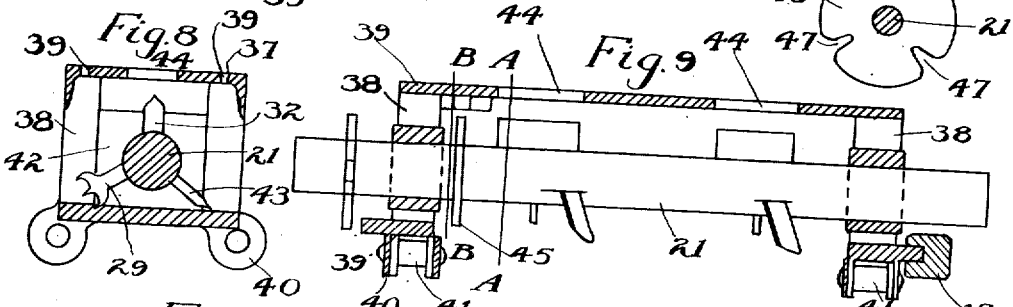
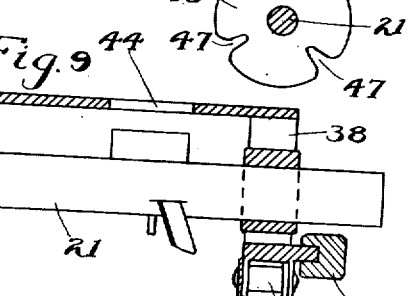
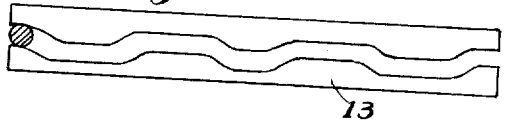
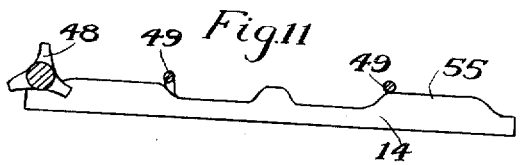
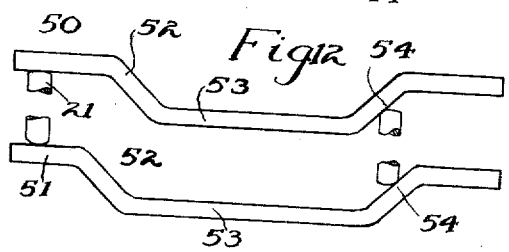

1,356,500.

Patented Oct. 19, 1920.
3 SHEETS—SHEET 3.

INVENTOR
Henry Wulff.
By C. D. Enochs
ATTORNEY

UNITED STATES PATENT OFFICE.

HENRY WULFF, OF ST. PAUL, MINNESOTA, ASSIGNOR TO SILAS M. FORD, OF ST. PAUL, MINNESOTA.

MACHINE AND METHOD FOR MAKING FIBER SHINGLES.

1,356,500.  Specification of Letters Patent.  Patented Oct. 19, 1920.

Application filed January 11, 1917. Serial No. 141,895.

*To all whom it may concern:*

Be it known that I, HENRY WULFF, a citizen of the United States, and a resident of St. Paul, in the county of Ramsey and State of Minnesota, have invented new and useful Improvements in Machines and Methods for Making Fiber Shingles, of which the following is a specification.

One object of my invention is to provide in a machine for making fiber shingles, means for holding material firmly and performing a series of operations on the material while it is in the holding means.

Another object of my invention is to provide an endless moving table for firmly holding the material from which shingles are made and to have embodied in the moving table tools arranged to perform functions on the shingle material in a certain predetermined cycle.

Another object of my invention is to provide means for stripping granular and water proof coats from the shingle material while it is in motion.

Another object of my invention is to provide means for slitting and scoring the shingle material while it is in motion.

Another object of my invention is to provide an improved method for making fiber shingles wherein the material is carried along together with certain tool holders and the operations performed on the material while it is in motion.

Another object of my invention is to provide means for forming the side edges of the shingle tabs while the shingle material is in motion.

With these and incidental objects in view, the invention consists of certain novel features of construction and combinations of parts, the essential elements of which are hereinafter described with reference to the drawings which accompany and form a part of this specification.

Figure 1 is a side elevation of my machine for manufacturing fiber shingles.

Fig. 2 is a plan view of a portion of the finished material after it has been cut and formed by the machine, Fig. 3 is an end sectional view of the shingle material during the scraping and scoring operation.

Fig. 4 is a view of the material during the same operation.

Fig. 5 is an end view of the material during the forming operation.

Fig. 6 is an end view of the material as it is formed.

Fig. 7 is a view taken on the line BB of Fig. 9 showing the locating disk.

Fig. 8 is a sectional view taken on the line AA of Fig. 9.

Fig. 9 is a sectional view of a unit of the endless table.

Fig. 10 and Fig. 11 are side elevations of the raising and lowering cams.

Figure 13:
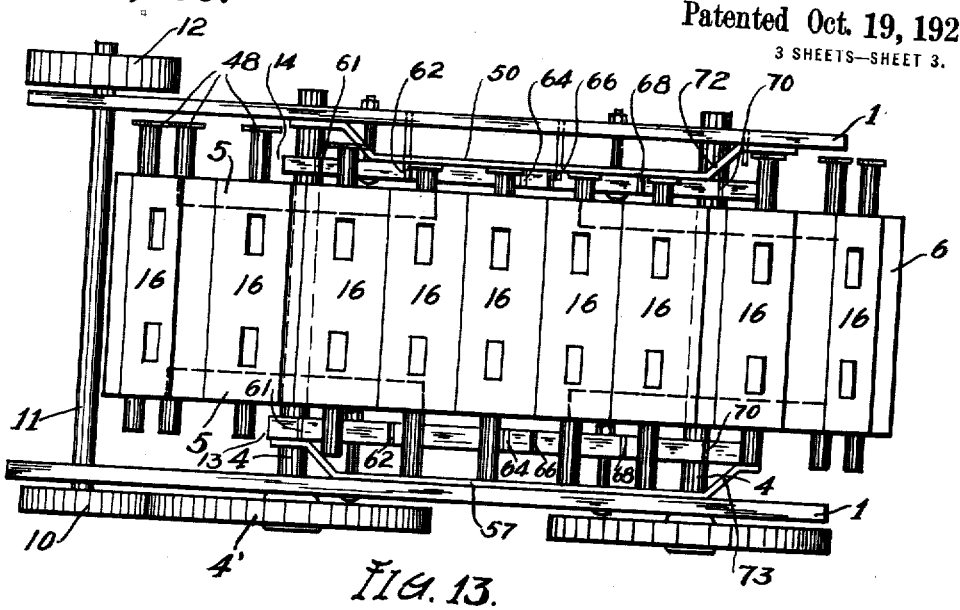
Figure 14:
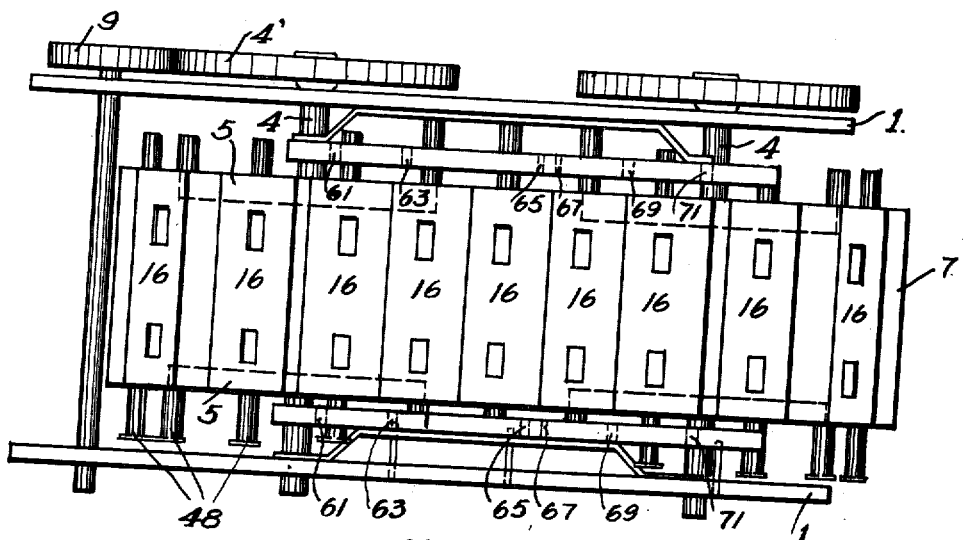

Fig. 12 is a plan view of the cams controlling the transverse horizontal movement of the tool operating part. Fig. 13 is a plan view of the machine as shown in Fig. 1, but with the upper half thereof removed along the line 17—17'. Fig. 14 is a plan view of the upper half of the machine when turned upside down.

This machine is designed to receive a sheet of suitable stock at 17, Fig. 1, and to perform certain operations on the sheet as it passes through the machine from left to right so that when it leaves the machine at 17' shingle strips, such as shown in Fig. 2, will have been completed.

A frame 1, Figs. 1, 13 and 14, has mounted thereon slidable bearings 2 and fixed bearings 3, Fig. 1.

Journaled in bearings 2 and 3 are shafts 4 which have mounted thereon sprockets 5 carrying the endless sectional tables 6 and 7.

The outer ends of the shafts 4, shown at the left of Fig. 1, have mounted thereon gears 4' which mesh with gears 9 and 10, as shown.

The gear 10 is carried by a shaft 11 which has mounted on its opposite end the pulley 12, which is to be driven by the source of power operating the machine.

The endless tables 6 and 7 are composed of similar units 16 hinged together at 40 by pins 41, Figs. 1, 8 and 9, so as to form endless belts or moving tables which, during their horizontal motion, present flat and rigid table-like surfaces.

It is apparent that the rotation of the pulley 12 will drive the moving tables and the direction of rotation is such that along the line 17—17' the tables move from left to right and will carry between them material introduced at 17.

The units 16 are preferably made with a face 37, Fig. 8, of steel channel section, at each end of which is attached a casting 38 held by screws 39. The lower end of this casting has a projection 39' which runs in the guide 15, Figs. 1 and 9.

The casting 38 also carries a slidable box 42, Fig. 8, which permits the shaft 21 to move in a vertical direction.

The shafts 21 are journaled in the boxes 42 so as to permit movement of the shafts in a transverse horizontal direction.

The shafts 21 carry tools and knives for operating on material passed through the machine, and each of the shafts carried by the upper table carries a scraping tool 25 and a forming tool 33, while each of the shafts carried by the lower table carries a scoring knife 29 and a forming tool 32, and every fifth one of the shafts of the lower set carries two cutting off knives 43.

The unit shown in Figs. 8 and 9 is one of the lower set which carries a scoring knife, a forming tool and cutting off knives.

The shafts 21 also each carry, rigidly attached thereto, star wheels 48 adapted to be rotated 120 degrees by pins 49, Figs. 1 and 11.

The position of the pins with respect to the star wheels is such that the shaft 21, Fig. 8, is rotated 120 degrees in a counter-clockwise direction each time the star wheel impinges on one of the pins 49.

To accurately locate the tools, a disk 45, keyed to the shaft 21, Fig. 7, receives a projection 46, rigidly mounted in the channel 37, Fig. 7, in the notch 47 as the shaft is moved upwardly as hereinafter described, thus holding the knives or forming tools rigidly and accurately in position.

Cams 13 and 14 are provided for giving the shafts 21 vertical motion so as to bring the tools into operative position, and cams 50 and 51 are likewise provided to give the shafts 21 transverse horizontal motions for the operation of the scraping, slitting, and cutting off tools.

Having described the construction of the machine, I will now follow its operation on a piece of suitable material as it passes through the machine from the point 17 to the point 17'.

A sheet of material introduced into the machine at 17 is seized between one of the units of the endless table above and its cooperating unit of the endless table below at the point 60, Fig. 1, and is carried through the machine under pressure between the two table-like surfaces.

As each unit passes the point 61, Fig. 1, its shaft 21 will be cammed downwardly by the cam 14 and at the same time the shaft of the corresponding lower unit will be cammed upwardly by the cam 13.

The angular position of the upper shaft 21 is such that the scraping knife 25 is presented to the material being passed through the machine, and the angular position of the corresponding lower shaft is such that the scoring and slitting knife 29 is presented to the material passing through the machine when the first camming surface of the cams 14 and 13, respectively, have moved these two shafts vertically.

With the scraping knife 25 and the scoring knife 29 in position with regard to the material passing through the machine, as shown in Figs. 3 and 4, the cams 50 and 51, Figs. 12, 13 and 14 are thrusting the shaft 21 both in the lower and upper units transversely so that the scraping knife scrapes the material from the top surface of the sheet of material, while the scoring knife scores and slits the material as shown in Fig. 3.

When the point 62 is reached by the shaft 21 of the upper set and the point 63 by the shaft in the lower set, the cams 14 and 13, respectively, will lift the upper and allow the lower shaft to fall to its original position, thus taking the scraping knife and the scoring knives from operative relation with the material.

At this point the star wheels of the two shafts impinge on the pins 49 and the shafts are rotated 120 degrees each.

The units pass along through the machine without further function until the points 64 and 65 are reached, and it will be seen that the upper shaft 21 is now turned so that no tool can be presented to the material, while the lower shaft is so turned that the forming tool 32 is presented to the material.

At the points 64 and 65 the two shafts are brought into operative relation with respect to the material, and the forming tool 32 forms the material upwardly, as shown in Fig. 5, while the upper shaft exerts no effort as no tool is presented.

At the points 66 and 67 the shafts are returned to their normal position, the star wheels again impinging on the pins 49 so that each shaft is again turned an additional 120 degrees, the upper shaft then presenting to the material the forming tool 33, while the lower shaft presents a blank to the material except that every fifth shaft of the lower set performs a function later described.

The shafts pass to the points 68 and 69 and are then brought again into operative relation with the material, and the tool 33 on the upper shaft forms the material as shown in Fig. 6, while the shaft 21 carries no tool and performs no function.

As the shafts move on to the points 70 and 71 they are returned to their normal position and the star wheel impinging on the next set of pins 49 again rotates each shaft 120 degrees to their normal position, so that when they return to the point 61 they are ready for the beginning of another cycle of operations.

After the upper shaft 21 has been returned to its normal position at the point 70 and while the lower shaft is still in operative position with respect to the paper, the shafts are moved transversely by the camming surfaces 72 and 73, this motion performing no function on the upper shaft and likewise no function on the lower shaft except in the case of every fifth lower shaft, which carries the two cutting off knives 43, and in the case of these shafts the cutting off knives are drawn across the material, thus completely severing it.

As there are two knives 43 it is evident that it is only necessary for each knife to be drawn one-half the length of the line 24, Fig. 2, to completely sever the shingle strip.

Claims:—

1. In a machine for making fiber shingles, the combination of a pair of sprocket wheels, a series of rigid unit sections interconnected and passing chain like over said sprocket wheels said unit sections being so formed as to present a flat table surface when passing from one of said sprocket wheels to the other, tools carried by said unit sections, and means for bringing said tools into operative relation with the material fed to said table like surface.

2. In a machine for making fiber shingles the combination of an upper and lower machine section, each of said machine sections comprising in combination a pair of shafts, each of said shafts having a pair of sprocket wheels thereon; a series of units interconnected with each other extending transversely parallel to said shafts and adapted to be carried by said sprocket wheels and form a rigid table like surface between said sprocket wheels, operating tools in said units and means for bringing said tools into operative relation with material passed between and held by the table like faces presented by the units as they pass between their co-acting sprocket wheels.

3. In a machine of the class described, a tool holder forming a unit section of an endless conveying table, a rotatable shaft in said tool holder, a tool carried by said shaft, means for sliding said shaft transversely; means for lifting said shaft vertically and means for rotating said shaft through a partial revolution.

4. In a machine of the class described, the combination of a series of unit sections interconnected with each other; sprocket wheels associated therewith for driving the combination of said units as an endless belt which forms a rigid operating table while passing between said sprocket wheels, a shaft in each one of said units and mounted therein for rotation, transverse horizontal motion and vertical motion, tools carried by said shafts, means for bringing a sheet of material into operative relation with said units, and means for imparting vertical motion to said shafts, means for imparting transverse, horizontal motion to said shafts and means for partially rotating said shafts at pre-determined points in its travel between said sprocket wheels.

5. In a machine of the class described having a series of unit sections which travel during a part of their cycle as a rigid table, a scoring knife, a slitting knife, a cutting off knife and a forming tool, means for bringing material to be worked upon into intimate relation with said rigid table, means for bringing said scoring knife into operative relation with said material; means for drawing said knife transversely across said matrial; means for bringing said forming tool into operative relation with said material; means for bringing said cutting off knife into operative relation with said material, and means for drawing said cutting off knife transversely across said material.

6. In a machine of the class described, the combination of a rigid moving table comprised of a series of units interconnected together, a second similar table positioned below said first table, said tables being adapted to receive therebetween material to be operated upon, means for moving said tables forward horizontally, tools associated with said units for operating on said material and means for actuating said tools while said table and said material are in motion.

HENRY WULFF.